(12) United States Patent
Church

(10) Patent No.: US 12,006,641 B2
(45) Date of Patent: Jun. 11, 2024

(54) SYNTHETIC TURF PUTTING GREEN PRODUCT AND METHOD

(71) Applicant: Bradford Dale Church, Hiddenite, NC (US)

(72) Inventor: Bradford Dale Church, Hiddenite, NC (US)

( * ) Notice: Subject to any disclaimer, the term of this patent is extended or adjusted under 35 U.S.C. 154(b) by 0 days.

(21) Appl. No.: 17/385,557

(22) Filed: Jul. 26, 2021

(65) Prior Publication Data

US 2022/0025588 A1 Jan. 27, 2022

Related U.S. Application Data

(60) Provisional application No. 63/056,818, filed on Jul. 27, 2020.

(51) Int. Cl.
| | |
|---|---|
| *E01C 13/08* | (2006.01) |
| *B32B 5/02* | (2006.01) |
| *B32B 5/24* | (2006.01) |
| *B32B 7/12* | (2006.01) |

(52) U.S. Cl.
CPC .............. *E01C 13/08* (2013.01); *B32B 5/026* (2013.01); *B32B 5/24* (2013.01); *B32B 7/12* (2013.01); *B32B 2255/02* (2013.01); *B32B 2307/56* (2013.01); *B32B 2307/726* (2013.01)

(58) Field of Classification Search
CPC ........... E01C 13/08; B32B 5/026; B32B 5/24; B32B 2255/02; B32B 2307/56; B32B 2307/726
USPC .......................................................... 428/17
See application file for complete search history.

(56) References Cited

U.S. PATENT DOCUMENTS

| | | | | |
|---|---|---|---|---|
| 4,254,179 A | * | 3/1981 | Carson, III | ............ A61K 8/046 |
| | | | | 428/323 |
| 2016/0319493 A1 | * | 11/2016 | Verleyen | ................ D04H 11/08 |
| 2017/0152619 A1 | * | 6/2017 | Beauprez | ............. D01D 5/0885 |
| 2019/0040593 A1 | * | 2/2019 | Tetrault | .................... B32B 27/12 |
| 2019/0352845 A1 | * | 11/2019 | Coon | ....................... B32B 27/12 |
| 2020/0071886 A1 | * | 3/2020 | Aldahir | .................. D04H 11/08 |
| 2020/0223196 A1 | * | 7/2020 | Fincher | ..................... B32B 5/08 |

FOREIGN PATENT DOCUMENTS

WO    WO-2014116113 A1 * 7/2014 ............. D05C 17/02

* cited by examiner

*Primary Examiner* — Katherine A Christy

(74) *Attorney, Agent, or Firm* — Charles T. Riggs, Jr.

(57) ABSTRACT

A synthetic turf putting green includes a backing, tufts of yarn, and one or more fabric, fiber or foam padding material having the tufts of yarn stitched therein. A liquid may be added to and absorbed by the fabric, fiber or foam pad or pads to produce an additional shock absorbing affect such that the bounce of a golf ball mimics the bounce on a natural/real grass putting green.

7 Claims, 8 Drawing Sheets

SYNTHETIC TURF PUTTING GREEN PRODUCT AND METHOD

BACKGROUND

Synthetic turf putting greens are practical for having low maintenance. However, current synthetic putting greens suffer from not being able to function the way a natural putting green does. Existing synthetic turf putting greens do not absorb a golf ball from a golf shot in a natural way and/or putt in a natural way. A natural green absorbs a golf ball from a golf shot in a natural way and putts in a natural way, but the everyday maintenance requires high expense to keep healthy and consistent.

Attempts to make a synthetic green capable of receiving a golf ball from a golf shot require high maintenance, and do not consistently putt very well. Attempts to make a synthetic green putt well, and also, capable of receiving a golf ball from a golf shot in a lifelike manner, with reduced maintenance have been incomplete. For example, synthetic putting greens manufactured with a tall pile height yarn that is infilled with sand helps receive a golf ball from a golf shot, but does not consistently putt very well (see FIG. 1). Sand filled synthetic putting greens require lots of maintenance and the cost is high. Short pile height yarn tightly woven and smooth putts very well, but does not receive a golf ball from a golf shot very well (see FIG. 2). Padding has been applied underneath both the "sand filled" and "non-infilled" synthetic turf to help with shock absorption, but this has had poor results, and has never proven to be a very effective long term solution.

Accordingly, to address and overcome the inefficiencies, limitations and disadvantages of existing synthetic putting greens described above, an improved synthetic putting green is needed which will receive a golf ball from a golf shot, and also putt like a natural putting green. The synthetic putting green and method of use disclosed herein fulfill such needs. It is desired that the presently disclosed product and method be applicable generally to any instances or applications involving sporting activities which can be played on a natural grass or grass like surface, such as baseball, softball, football, soccer, tennis, field hockey, lacrosse, cricket, bocce ball and the like.

SUMMARY

The present disclosure relates to one or more product(s) and method(s) relating to a synthetic turf playing surface, and in particular a synthetic putting green capable of absorbing a golf ball from a golf shot in a natural way and/or putting in a natural way which closely mimics the performance and function of a natural putting green. The synthetic turf putting green of the present disclosure is manufactured with a fabric inside of the yarn tufts. Once assembled into a putting surface, a liquid can then be applied that absorbs into the fabric, creating a shock absorbing pad that reduces the impact result that the tuft bind of synthetic turf creates, i.e., a very high bounce. As a result, the bounce of the golf ball is similar to that of a natural green, as opposed to the higher bounce produced from prior art synthetic putting greens. Additionally, the synthetic turf putting green of the present disclosure will maintain a consistent putting surface like natural grass, yet will not grow or experience health issues and potential death like natural grass.

DETAILED DESCRIPTION

Figure 1:
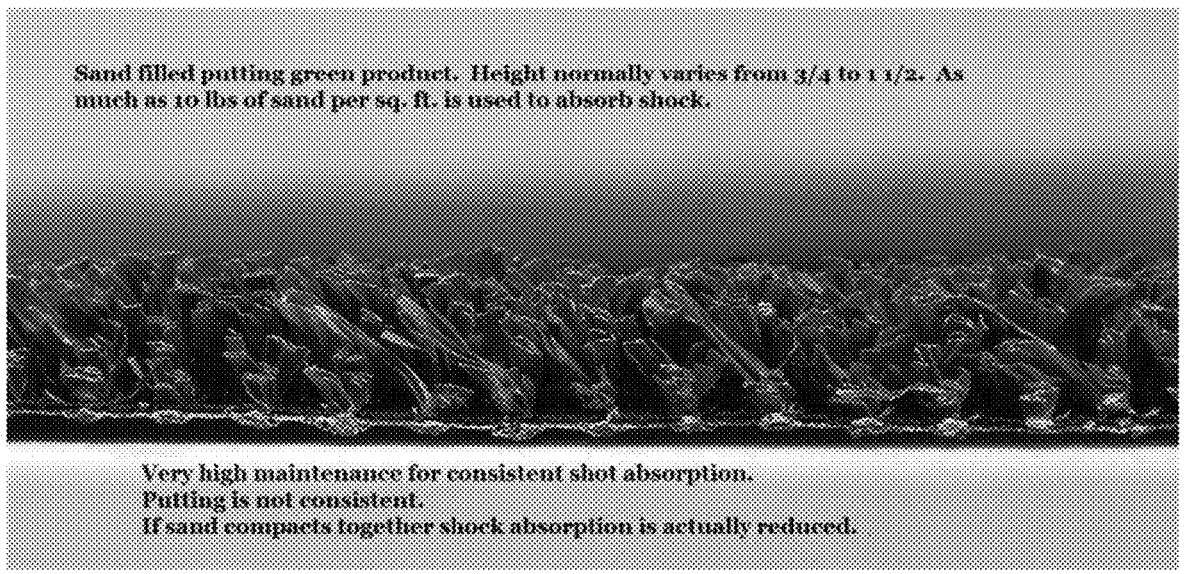
FIG. 1 is a picture of a prior art synthetic putting green manufactured with a tall pile height yarn that is infilled with sand.
Figure 2:
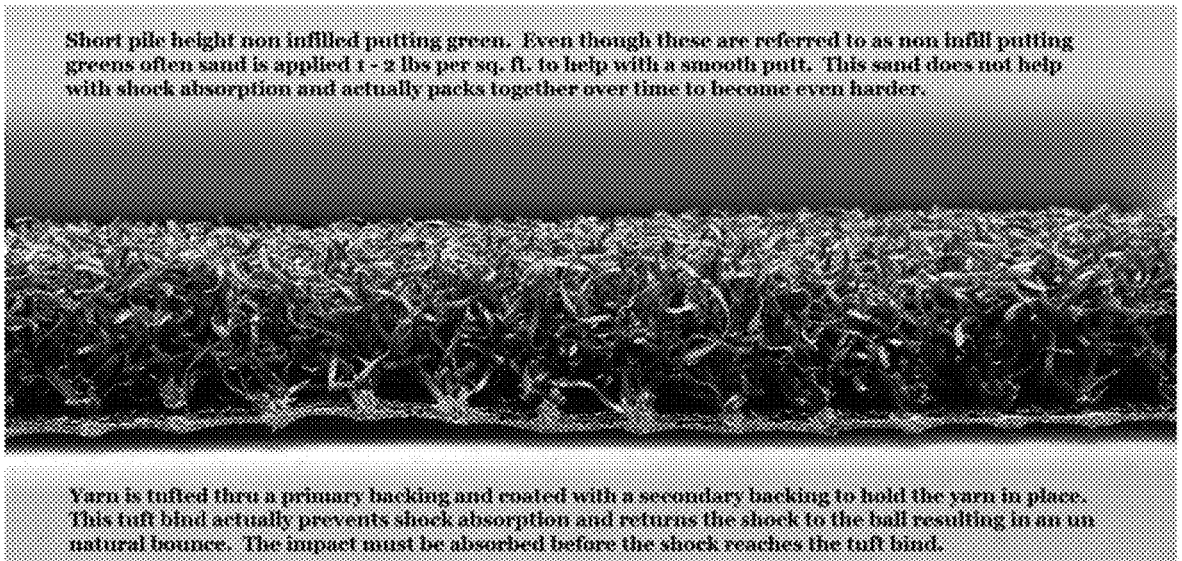
FIG. 2 is a picture of a prior art short pile height yarn that is tightly woven and smooth.

FIGS. 1 and 2 illustrate prior art synthetic turf putting greens. Specifically FIG. 1 shows a prior art synthetic putting green manufactured with a tall pile height yarn that is infilled with sand. FIG. 2 shows a prior art short pile height yarn that is tightly woven and smooth. These prior art synthetic turf putting greens suffer from the disadvantages and shortcoming discussed above.

Figure 3A:
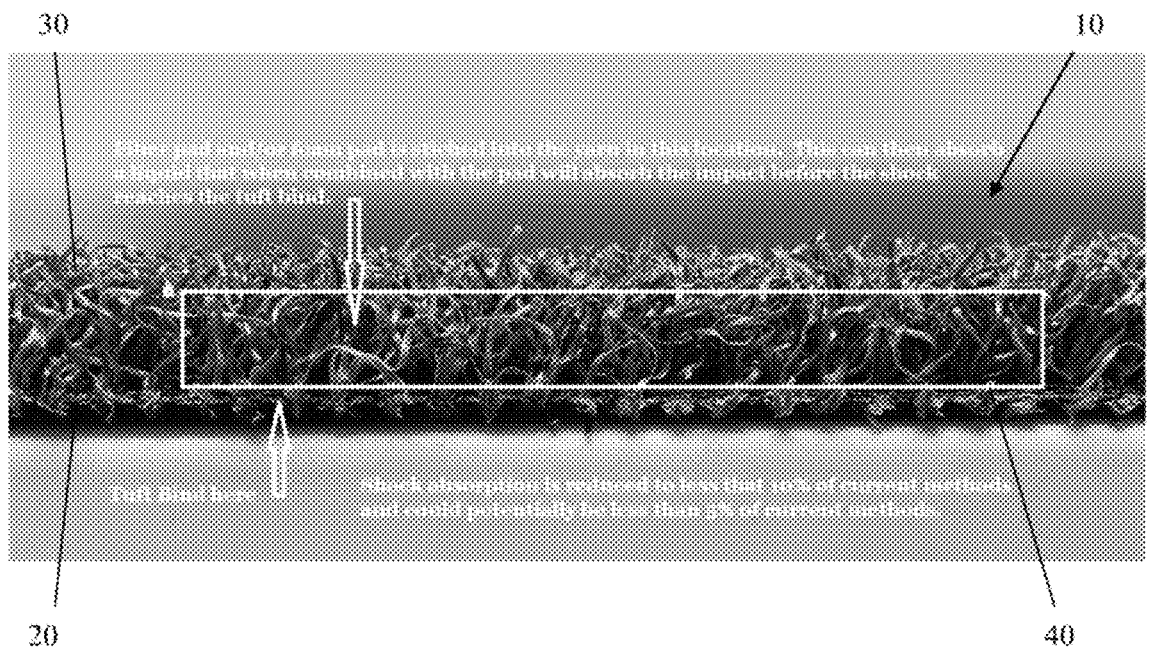
FIG. 3A is a schematic illustration of the synthetic turf putting green of the present disclosure.

FIG. 3A is a schematic illustration of the synthetic turf putting green 10 of the present disclosure, comprising a backing 20, tufts of yarn 30, and a padding material 40 illustrated schematically by a white outline showing the general location or area of the padding material 40. The tufts of yarn are interwoven with or through the padding material 40. The tufts of yarn are preferably made of polypropylene, nylon and/or polyethylene. The backing 20 is any suitable synthetic turf backing that can hold the tufts of yarn, as is known in the art. The padding material is fabric, fiber or foam, preferably in the form of a pad.

Figure 3B:
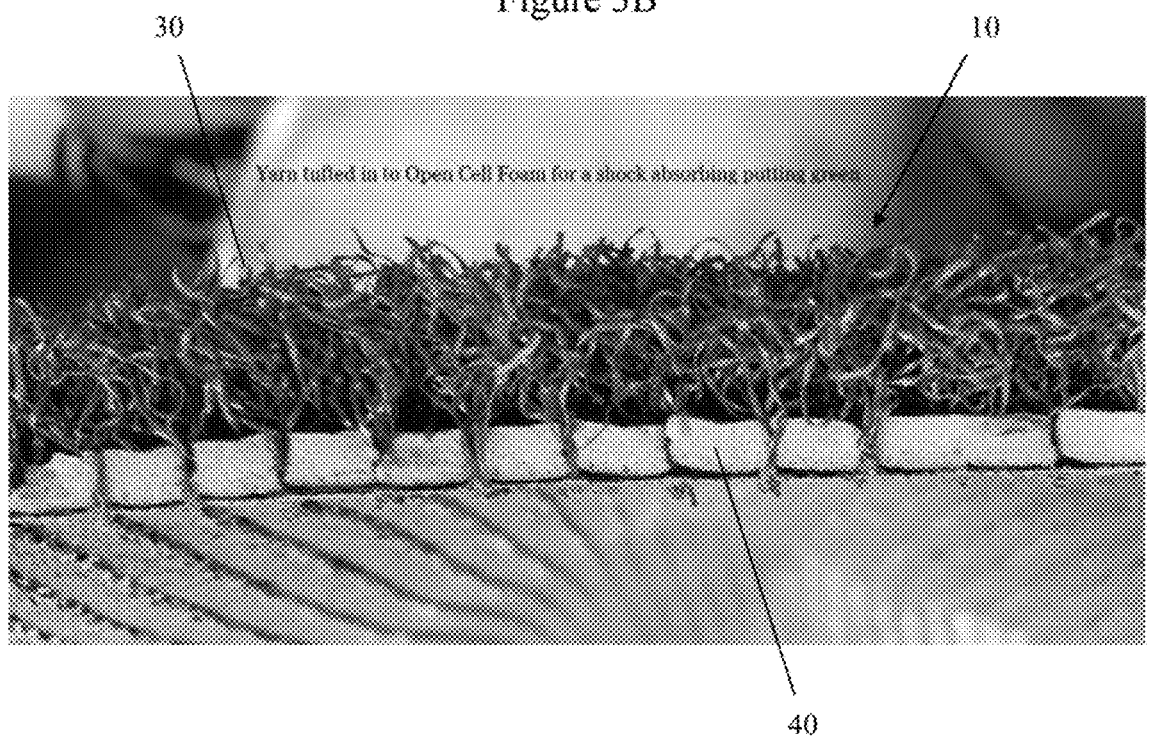
FIG. 3B is a picture of an embodiment of the synthetic turf putting green of the present disclosure.

FIG. 3B is a picture of an embodiment of the synthetic turf putting green 10 of the present disclosure, comprising tufts of yarn 30, and a padding material 40 in the form of open cell foam. As can be seen, the tufts of yarn are interwoven with or through the padding material 40. It should be understood that the stitch rows of the tufts of yarn, and the thickness of the foam padding material may be altered or varied as desired for performance purposes. For example, the thicker the pad, the more shock absorption is provided. The closer the stitch rows, the better the puttabilily of the synthetic putting turf.

Figure 4:
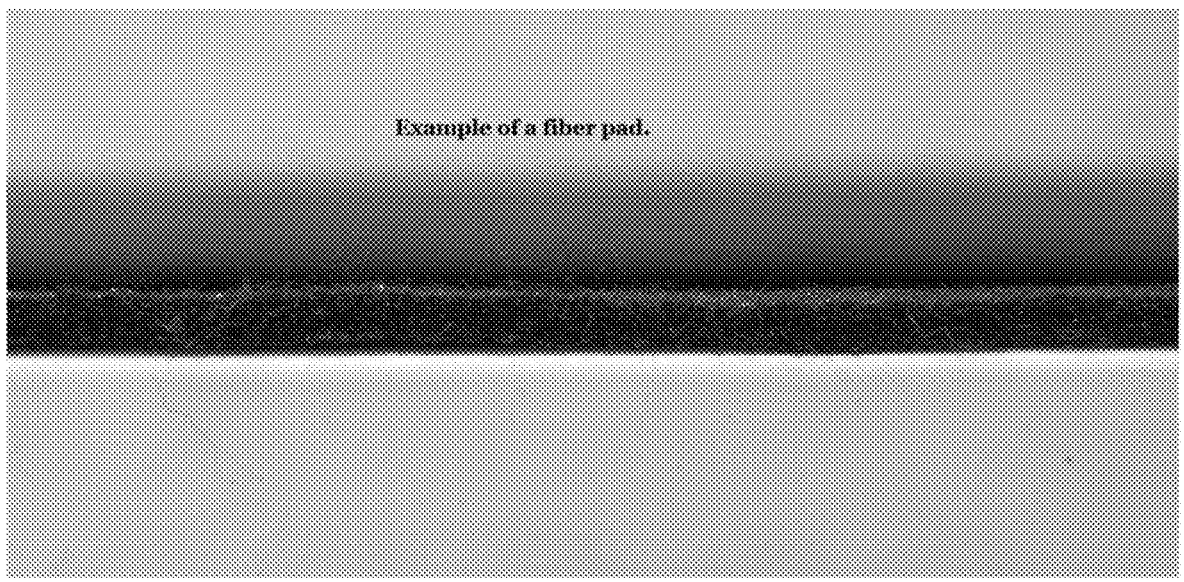
FIG. 4 is a picture of a fiber pad for use in an embodiment of the synthetic turf putting green of the present disclosure.
Figure 5:
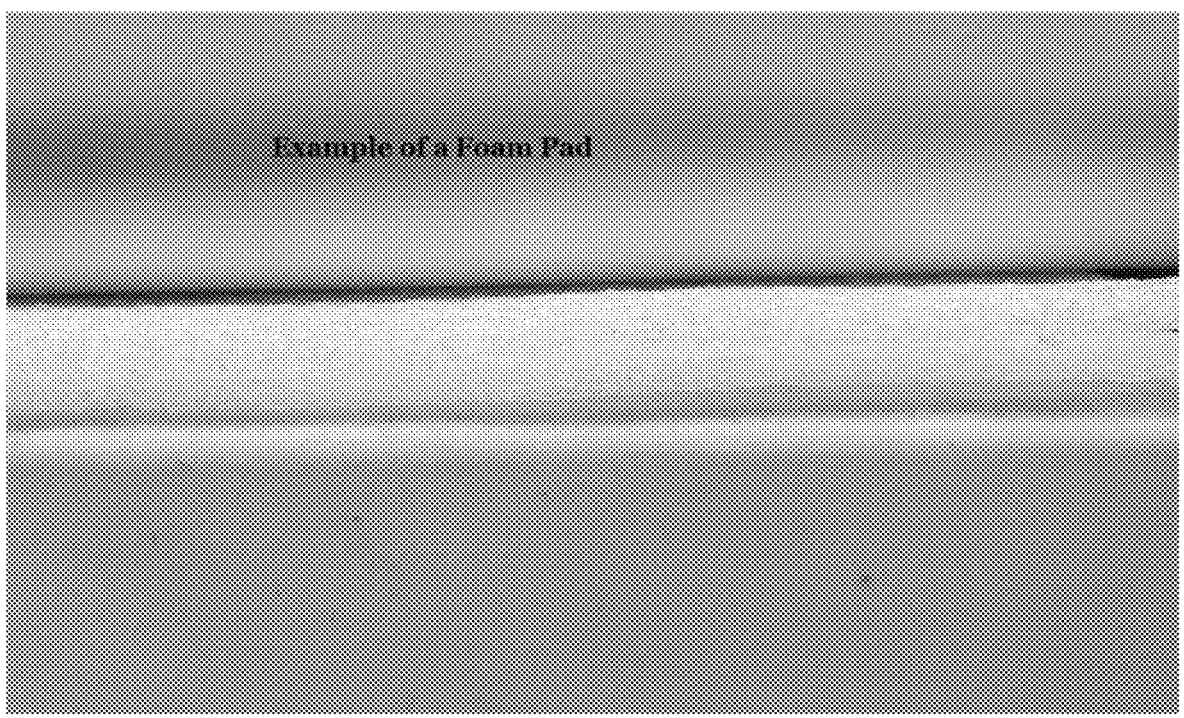
FIG. 5 is a picture of a foam pad for use in an embodiment of the synthetic turf putting green of the present disclosure.
Figure 6:
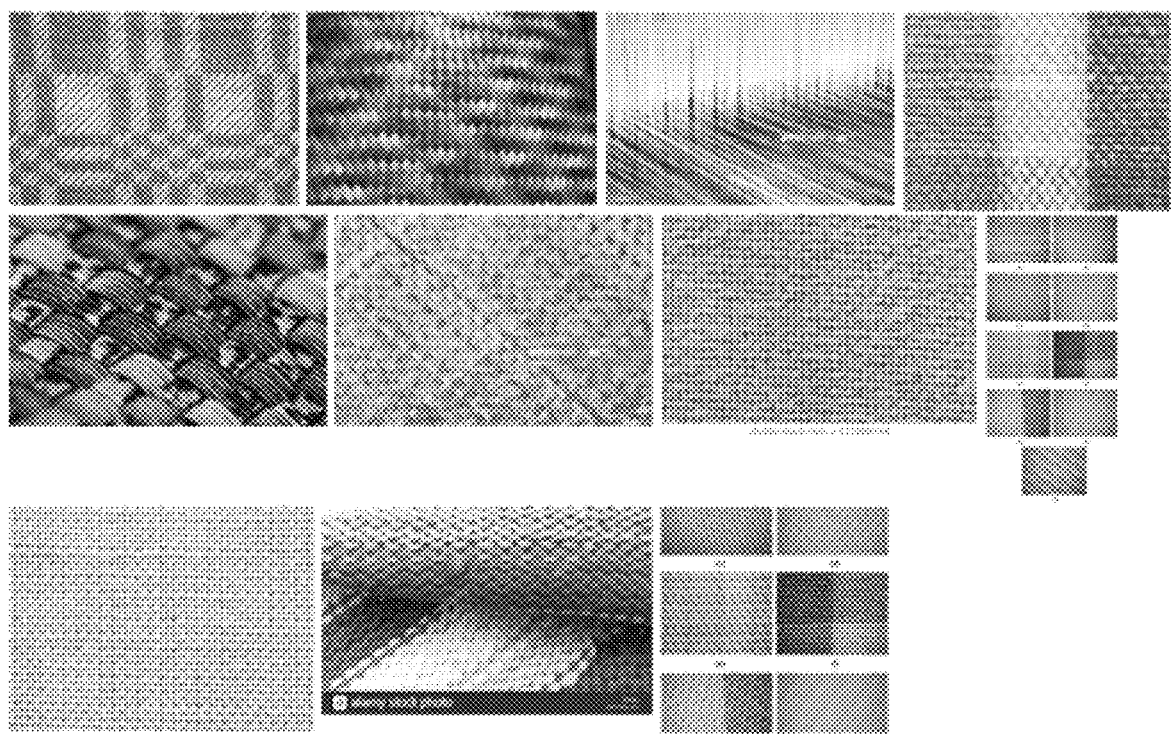
FIG. 6 is a picture of various woven pads for use in an embodiment of the synthetic turf putting green of the present disclosure.
Figure 7:
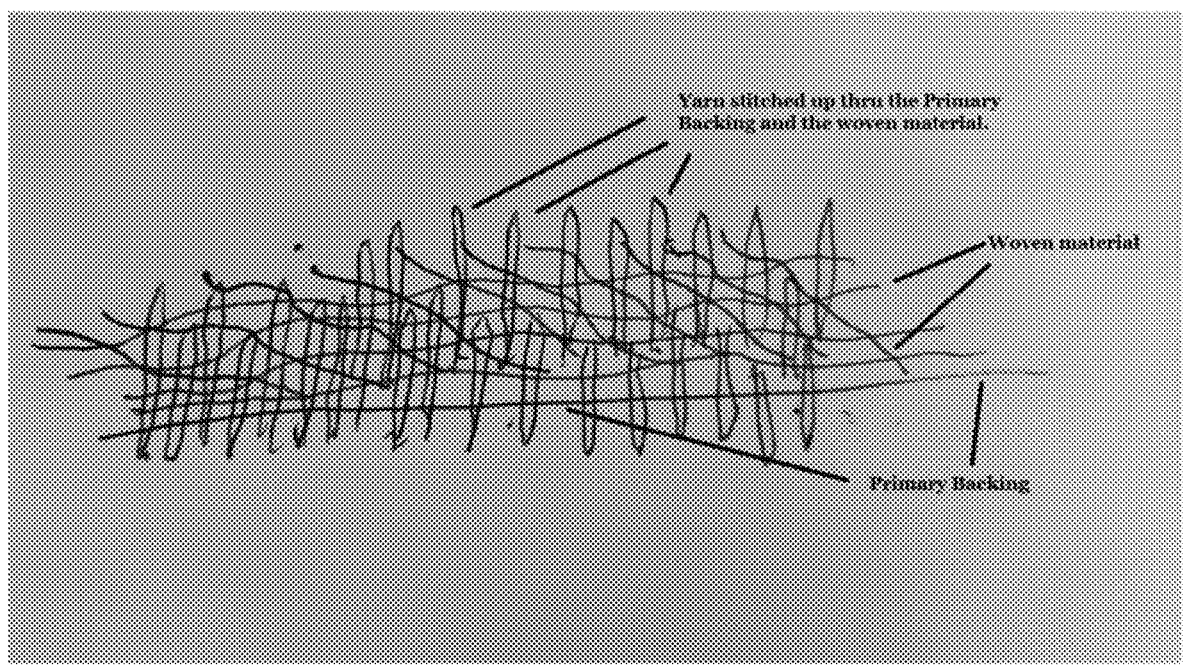
FIG. 7 is a schematic illustration of the turf yarn knitted up thru the pad and/or the primary backing of the synthetic turf putting green of the present disclosure.

For example, FIG. 4 illustrates a fabric pad which is placed in the location depicted in FIG. 3A by the white outline, and wherein the tufts of yarn extend therethrough. Alternatively, FIG. 5 illustrates a foam pad which is placed in the location depicted in FIG. 3A by the white outline, and wherein the tufts of yarn extend therethrough. As another alternative. FIG. 6 illustrates various woven pads, a select one of which is placed in the location depicted in FIG. 3A by the white outline, and wherein the tufts of yarn extend therethrough. FIG. 7 is a schematic illustration of the tufts of yarn extending through one of the pads.

Figure 8:
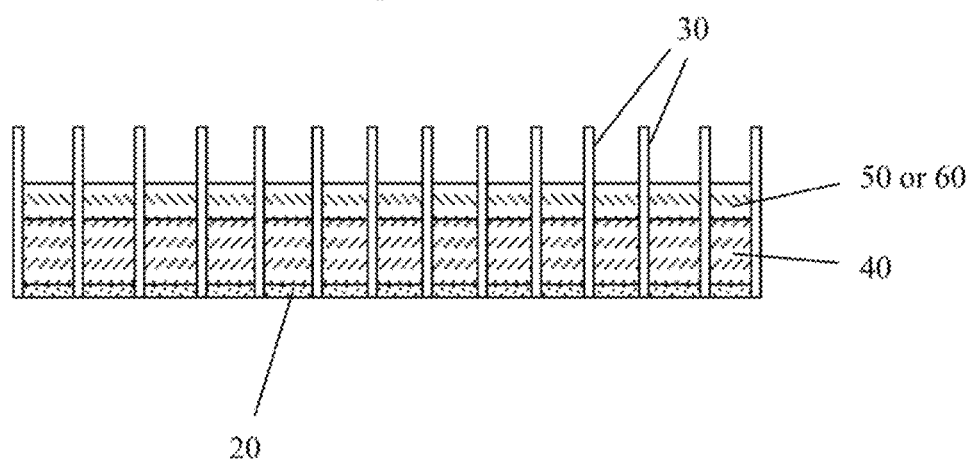
FIG. 8 is a schematic illustration of an alternate embodiment of the synthetic turf putting green of the present disclosure.

FIG. 8 is a schematic illustration of a multi-layer synthetic putting green. In this embodiment, an additional foam, fiber or fabric layer is added in combination with the initial padding and the tufts of yarn of FIG. 3A or 3B. For example, a layer of moisture absorbing material such as woven fiber 50 or fabric 60 is provided above a layer of foam 40, along with the tufts of yarn 30, to create at least three layers, and increase shock absorption and performance. The tufts of yarn 30 may be woven through both the foam layer 40 and the moisture absorbing layer 50 or 60, as illustrated. Alternatively, the tufts of yarn 30 may be woven through just the moisture absorbing layer, and then the moisture absorbing layer suitably attached to the foam layer, for example with an adhesive. Backing 20 is also illustrated under the foam layer 40. Again, the stitch row width and the thickness of the foam (open or closed cell), fiber and/or fabric can vary to add more protection and performance characteristics. Additional layers of foam, fiber and/or fabric may be added as well, and in a variety of different combinations and thicknesses. For example, at least one additional layer of foam, fiber or fabric can be added to a base layer of foam, fiber or fabric having a backing, with the tufts of yarn woven therethrough. A second additional layer of foam, fiber or fabric can further be added. The synthetic putting green can thus be comprised of a foam layer and a fiber layer, a foam layer and a fabric layer, or a foam layer, a fiber layer and a fabric layer, etc. In general, the layer or layers of the synthetic putting green can comprise any suitable material, in any suitable layers, in any suitable order.

It should be understood that any suitable non-woven fabric, woven fabric and/or any type of foam or fiber pad, or combination thereof, may be used to create shock absorption by knitting, stitching or otherwise extending the turf yarn into and through the padding material or through both the backing and the padding material. In general, any suitable synthetic turf, grass or yarn material can be knitted up thru any suitable padding or shock absorbing material, using for example a knitting needle, or sewing machine, or the like, to create shock absorption for the putting green of the present disclosure.

A liquid may can be added to and absorbed by the fabric, fiber or foam pad in some cases, which will then act as a shock absorber such that the bounce of a golf ball from a golf shot mimics the bounce on a natural/real grass putting green. In this manner, the impact is absorbed by the padding material before the shock reaches the backing/tuft bind. Additionally, putting is consistent and closely mimics a putt on a natural/real grass putting green. Any suitable liquid for this purpose can be used. Preferably, water would be the most common but other liquids may be used. For example, a Canola oil and/or Vegetable oil, alone or blended with other liquids may be used.

The fabric is lightweight and allows for reasonable shipping and handling cost. Tufting of the yarn up thru the additional fiber and/or pad material provides the shock absorption properties of the synthetic turf. Preferably, a thin thick fluid is added during the installation process to increase the shock absorption properties of the synthetic turf. Shock absorption is improved in the installation method. Shipping/handling costs are reduced by adding/increasing shock absorption with fluid during the installation. The amount of fluid is reduced by only installing on finished product when required. The fluid preferably has a pine/outdoor fragrance added to enhance the product. Antimicrobial and pesticide can be added to improve the performance and resist pests.

Using the synthetic turf putting green of the present disclosure also allows for decrease in golf green cost and maintenance, including reduced labor cost, reduced chemicals, reduced equipment usage, and reduced water usage.

It should be understood that the components of the product(s) and method(s) disclosed herein can take any suitable form, including any suitable materials or components capable of adequately performing their respective intended functions, as may be known in the art. For example, instead of the fabric being in a pad form, the fabric could take the form of tufts of fabric disbursed equally among the tufts of yarn. Further, while the embodiment(s) are illustrative of the structure, function and operation of the exemplary product(s) and method(s), it should be understood that various modifications may be made thereto with departing from the teachings herein.

While the foregoing discussion presents the teachings in an exemplary fashion with respect to the disclosed synthetic turf putting green and method of using the same, it will be apparent to those skilled in the art that the present disclosure may apply to any product or method used as a surface for playing sports or other activities involving use of a ball or other game equipment. Further, while the foregoing has described what are considered to be the best mode and/or other examples, it is understood that various modifications may be made therein and that the subject matter disclosed herein may be implemented in various forms and examples, and that the product(s) and method(s) may be applied in numerous applications, only some of which have been described herein.

What is claimed is:

1. A synthetic turf putting green, comprising:
   a first layer of moisture absorbing and shock absorbing material, wherein the first layer comprises at least one foam pad it combination with an oil applied to the at least one foam pad;
   a second layer comprising a backing material attached underneath the first layer;
   tufts of yarn extending from the backing material and through the first layer of moisture absorbing and shock absorbing material, wherein the tufts of yarn form a putting green surface; and
   a third layer comprising an open cell foam pad below the first layer of moisture absorbing and shock absorbing material and underneath the second layer of backing material, wherein the open cell foam pad is separate from the tufts of yarn;
   wherein the first layer, the second layer, and the third layer form at least a three layer synthetic turf with the at least one foam pad being the top layer, the backing material being the middle layer, and the open cell foam pad being the bottom layer, and with the tufts of yarn extending from the middle layer through the top layer.

2. A method of making a synthetic turf putting green comprising the steps of:
   affixing tufts of yarn to a yarn backing material;
   attaching the yarn backing material underneath a foam pad having moisture absorbing properties;
   extending the tufts of yarn through the foam pad;
   applying oil to the foam pad to create a shock absorbing material comprising in combination the foam pad and the oil;
   placing an open cell foam pad, separate from the tufts of yarn, beneath the foam pad and the yarn backing material to form a three layer synthetic turf with the foam pad being the top layer, the yarn backing material being the middle layer, and the open cell foam pad being the bottom layer, and with the tufts of yarn extending from the middle layer through the to layer.

3. The synthetic turf putting green of claim 1, further comprising an outdoors fragrance applied to the foam pad.

4. The synthetic turf putting green of claim 3, wherein the outdoors fragrance is pine.

5. The method of making a synthetic turf putting green of claim 2, further comprising the step of applying an outdoors fragrance to the foam pad.

6. The method of making a synthetic turf putting green of claim 5, wherein the outdoors fragrance is pine.

7. The synthetic turf putting green of claim 1, wherein the foam pad in combination with an oil is an open cell foam pad.

\* \* \* \* \*